US011023553B2

(12) United States Patent
Kohlmeier et al.

(10) Patent No.: US 11,023,553 B2
(45) Date of Patent: Jun. 1, 2021

(54) IDENTIFYING AND MANAGING TRUSTED SOURCES IN ONLINE AND NETWORKED CONTENT FOR PROFESSIONAL KNOWLEDGE EXCHANGE

(71) Applicant: Microsoft Technology Licensing, LLC, Redmond, WA (US)

(72) Inventors: Bernhard S. J. Kohlmeier, Seattle, WA (US); Douglas M. Taylor, Kirkland, WA (US); Pradeep Chilakamarri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 15/872,785

(22) Filed: Jan. 16, 2018

(65) Prior Publication Data
US 2018/0285468 A1 Oct. 4, 2018

Related U.S. Application Data

(60) Provisional application No. 62/481,623, filed on Apr. 4, 2017.

(51) Int. Cl.
*G06F 16/955* (2019.01)
*G06F 16/951* (2019.01)
(Continued)

(52) U.S. Cl.
CPC .......... *G06F 16/9566* (2019.01); *G06F 16/93* (2019.01); *G06F 16/95* (2019.01); *G06F 16/951* (2019.01); *G06F 16/958* (2019.01)

(58) Field of Classification Search
USPC ....................................................... 707/751
See application file for complete search history.

(56) References Cited

U.S. PATENT DOCUMENTS 7,249,123 B2 7/2007 Elder et al.
7,668,887 B2 2/2010 Vella
(Continued)

FOREIGN PATENT DOCUMENTS

WO 2007142941 A2 12/2007

OTHER PUBLICATIONS

Dagstuhl KM Seminar: Final Program and Abstracts, Retrieved from: https://www.google.co.in/url?sa=t&rct=j&q&esrc=s&source=web&cd=2&cad=rja&uact=8&ved=0ahUKEwil8ZS3wY3TAhVLp48KHduCBZYQFggiMAE&url=https%3A%2F%2Fwww.dagstuhl.de%2FReports%2F00%2F00281.doc&usg=AFQjCNG3b6Og9OORpmssRy9o_LepOuCcdA&sig2=agg9pkPu7ulzkXJGoaxyqQ&bvm=bv.151426398%2Cd.c2I, Retrieved Date: Apr. 4, 2017, 19 Pages.
(Continued)

*Primary Examiner* — Muluemebet Gurmu
(74) *Attorney, Agent, or Firm* — Talem IP Law, LLP

(57) ABSTRACT

Systems and methods are provided for identifying and managing trusted sources in online and networked content. URLs and other objects are vetted and identified as trusted sources based on the documents in which these objects are used or otherwise acted upon and not on the content of the URLs or other objects themselves. When a URL or other object is used in a document, the URL is given a score based on the use activity, attributes of the document itself, and, optionally, user history of the user. As users use that same URL with respect to their documents, the scores from those activities are accrued to that URL. A URL with an accrued score (value) above (or equal to) a threshold value can be added to a corpus of trusted sources that can be accessed when conducting research and/or by other applications and search engines.

14 Claims, 12 Drawing Sheets

(51) Int. Cl.
  *G06F 16/958* (2019.01)
  *G06F 16/95* (2019.01)
  *G06F 16/93* (2019.01)

(56) References Cited

U.S. PATENT DOCUMENTS

| | | | |
|---|---|---|---|
| 7,698,442 B1 | 4/2010 | Krishnamurthy et al. | |
| 8,056,128 B1 | 11/2011 | Dingle et al. | |
| 8,078,617 B1 * | 12/2011 | Neveitt et al. | G06F 17/30 707/732 |
| 8,515,972 B1 | 8/2013 | Srikrishna et al. | |
| 8,615,481 B1 | 12/2013 | Pragada et al. | |
| 8,898,152 B1 | 11/2014 | Ie et al. | |
| 2004/0049478 A1 * | 3/2004 | Jasper et al. | G06F 7/00 707/999.001 |
| 2005/0165709 A1 | 7/2005 | Bromberg et al. | |
| 2006/0004748 A1 | 1/2006 | Ramarathnam et al. | |
| 2007/0150468 A1 * | 6/2007 | Goldman et al. | G06F 17/30 707/999.005 |
| 2008/0189269 A1 * | 8/2008 | Olsen | G06F 17/30 707/999.005 |
| 2011/0078049 A1 | 3/2011 | Rehman et al. | |
| 2011/0252342 A1 * | 10/2011 | Broman | G06F 3/048 715/760 |
| 2011/0276601 A1 | 11/2011 | Pin et al. | |
| 2013/0117668 A1 | 5/2013 | Joseph et al. | |
| 2016/0092513 A1 | 3/2016 | Goodwin et al. | |
| 2016/0275069 A1 | 9/2016 | Bastide et al. | |
| 2018/0232394 A1 | 8/2018 | Danziger et al. | |
| 2019/0129952 A1 | 5/2019 | Yoshida | |

OTHER PUBLICATIONS

"International Search Report and Written Opinion Issued in PCT Application No. PCT/US2018/024235", dated: Jun. 5, 2018, 14 Pages.

"International Search Report and Written Opinion Issued in PCT Application No. PCT/US2019/029644", dated: Jun. 24, 2019, 11 Pages.

"Non Final Office Action Issued in U.S. Appl. No. 15/990,216", dated Sep. 16, 2019, 14 Pages.

"IBM Support: Building a knowledge base for IBM Content Classification V8.8", http://www-01.ibm.com/support/docview.wss?uid=swg27020839, Retrieved on: Apr. 4, 2017, 13 pages.

"Talisma: Finding the information you need is easier than you think", http://web.archive.org/web/*/http:/www.talisma.com/products/Product Sheet/Talisma Knowledge Base.pdf, Published on: Sep. 9, 2014, 4 pages.

Engers, et al., "Facilitation of Business Process Redesign by constructing a Shared Conceptual Model: Power", https://www.google.co.in/url?sa=t&rct=j&q=&esrc=s&source=web&cd=2&cad=rja&uact=8&ved=0ahUKEwil8ZS3wY3TAhVLp48KHduCBZYQFggiMAE&url=https%3A%2F%2Fwww.dagstuhl.de%2FReports%2F00%2F00281.doc&usg=AFQjCNG3b6Og90ORpmssRy9o_LepOuCcdA&sig2=agg9pkPu7ulzkXJGoaxyqQ&bvm=bv.151426398,d, "Year: 2000".

* cited by examiner

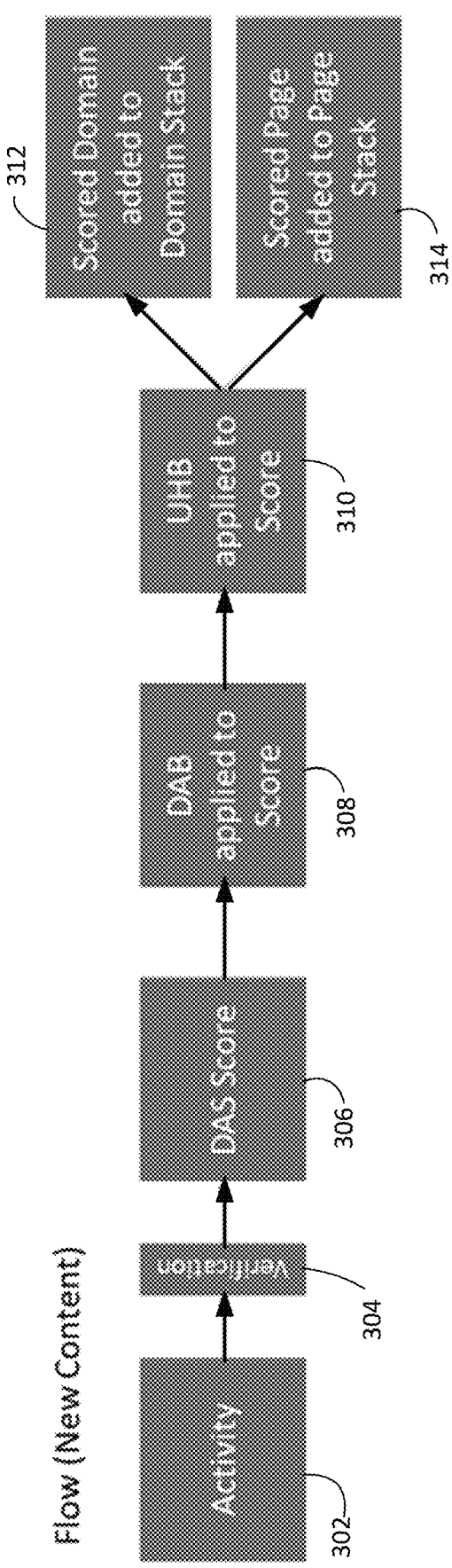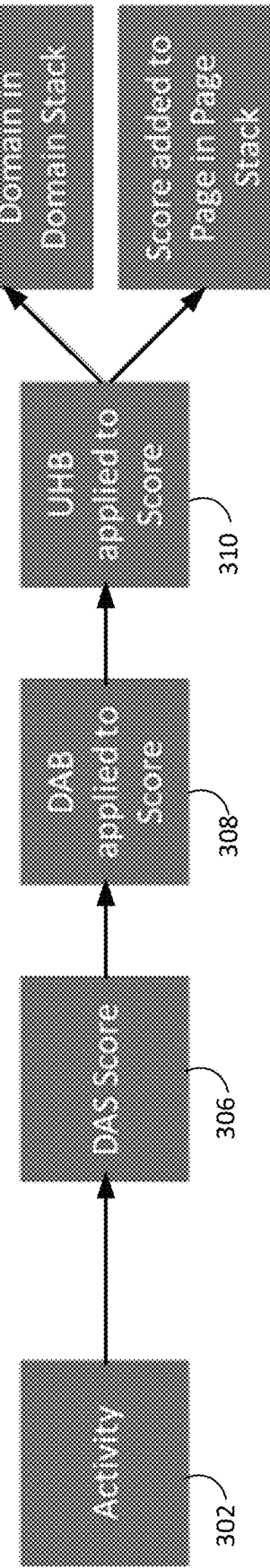
FIG. 3A
FIG. 3B

IDENTIFYING AND MANAGING TRUSTED SOURCES IN ONLINE AND NETWORKED CONTENT FOR PROFESSIONAL KNOWLEDGE EXCHANGE

CROSS-REFERENCE TO RELATED APPLICATION

This application claims the benefit of U.S. Provisional Patent Application Ser. No. 62/481,623, filed Apr. 4, 2017.

BACKGROUND

Accumulating and uncovering reliable knowledge over the Internet can be a challenge. Currently, many algorithms for returning search results via common search engines include paid advertisements. Popular content tends to be pushed up in positions by a ranker of the search engine, which causes results served up by the search engines to reflect the behavior of their users. Therefore, the bias of users can be reflected directly in the results. In addition, the click stream can cause popular articles to become even more popular, establishing and reinforcing a consensus about what is and is not important. Ranking of results may be based on the number of "clicks" a link may get over time, which can result in "clickbait" attempts to increase visibility, or may be based on key word tags, which can also be subject to manipulation. However, articles that are clicked on are not necessarily read, but the increasing click stream on the articles may drive dubious content to the top.

Furthermore, misinformation or disinformation on the web can lead to serious errors. For example, in search boxes providing mined answers, researching on the web can include wrong and partially wrong results. Mined answers present what looks like authoritative facts. Superficial research can lead to students picking up wrong or conflated information, particularly when the results are scrapes (e.g., via bots across the web) combining different sources, which can also suffer the same problems as mentioned above.

BRIEF SUMMARY

Systems and methods are provided for identifying and managing trusted sources in online and networked content. URLs and other objects are vetted and identified as trusted sources based on the documents in which these objects are acted upon and not on the content of the URLs or other objects themselves.

When a URL or other object is acted upon or otherwise used in a document, the URL is given a score based on the manner in which the URL was used (including how the URL entered the document), attributes of the document itself, and, optionally, user history. As users act upon the same URLs, the scores from those actions are accrued to that URL. A URL with an accrued score (value) above (or equal to) a threshold value can be added to a corpus of trusted sources that can be accessed when conducting research (and/or by other applications including search engines and rankers).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A illustrates a process flow for new content.

FIG. 3B illustrates a process flow for seeded content.

DETAILED DESCRIPTION

Figure 1A:
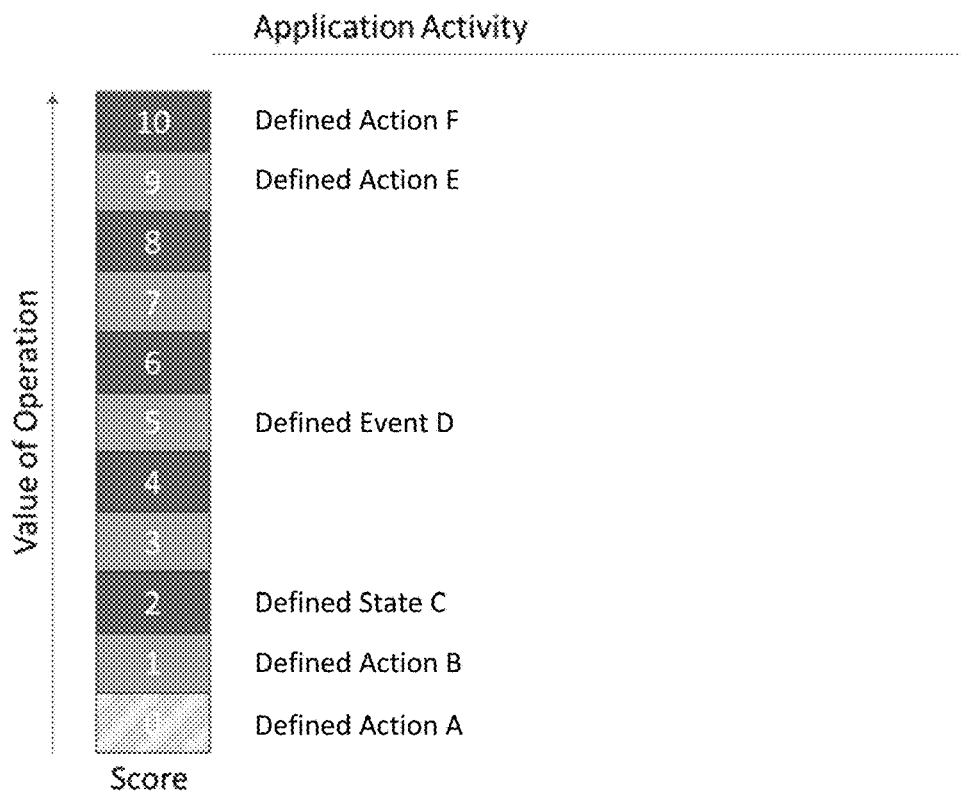
FIGS. 1A and 1B illustrate example document activity scoring systems.

Instead of attempting to eliminate undesired content (e.g., clickbait, misinformation, and the like), the described systems and techniques increase coverage of quality content. Some attempts to identify trusted content include using sources vetted from the online encyclopedia Wikipedia, a trademark of the Wikimedia Foundation, and content reference sources of academic content. The described systems and techniques increase the trusted content coverage forming a "Trusted Web".

Vetted and trusted sources can be considered part of the "Trusted Web". It is also possible to have a tenant-based Trusted Web that is customized to a particular organization (e.g., a "Custom Trusted Web"). Although specific discussion herein is directed to uniform resource locators (URLs), other objects such as media and documents (and components such as text, ink, images, rich text, and structured data) can be subject to similar vetting.

Trusted content refers to content that has scholarly or professional value. Trusted content does not have to be universally acknowledged as being true. A trusted content set can reflect a diversity of points of view, which add to a more complete understanding of the topic involved and which may encourage critical thinking.

Office productivity software users—general/individual users or enterprise tenant users will be able to achieve better results by contributing to, and benefiting from, the day-to-day usage of the productivity applications to discover vetted and trusted sources. Office productivity software refers to integrated applications for word processing, spreadsheets, presentations, database management, email, and more. Examples of Office productivity software include Microsoft Office and Office 365 from Microsoft Corp., Apache OpenOffice, LibreOffice from The Document Foundation, and Google Docs or G Suite from Google Cloud.

In addition to Office productivity software, singular productivity applications (that may or may not be part of the available suite of applications for office productivity software) may provide the signal used by the described systems and techniques. Examples of productivity applications include, but are not limited to Microsoft Word and Microsoft OneNote from Microsoft Corp., Scrivener from Literature & Latte, and Apple Pages from Apple Inc.

In the course of professional or scholar content creation, users of productivity applications perform tasks that can indicate that the content being used can be trusted. For example, documents with citations or footnotes may be considered more trustworthy, or even that information was inserted from a researcher application may be considered a "high value" activity. As another example, the complexity and type of document the user is working on can reflect a "high value" activity. High value activities, or tasks, performed on URLs (or other objects) by a user of a productivity application can be scored and, for the URLs, the page and domain will be stored. Conceptually, the page(s) and domain(s) of the URLs can be thought of as being placed in a stack. Further actions with the URLs will accrue to the value of the asset (here, the URL page and/or domain; in other cases, as previously briefly mentioned, the asset may be a component or part of a document).

A scoring system is provided that includes a Document Activity Score (DAS). The DAS is directed to application activity, for example, the types of activities carried out on a document. The value for the DAS is determined by the complexity of the task and indication for professional context. High value tasks performed on URLs will be scored and the page and domain of the URL will be placed in a stack. The DAS provides a base score for the page and the site. Further actions will then accrue to the value of the asset (the asset being the URL).

Figure 1B:
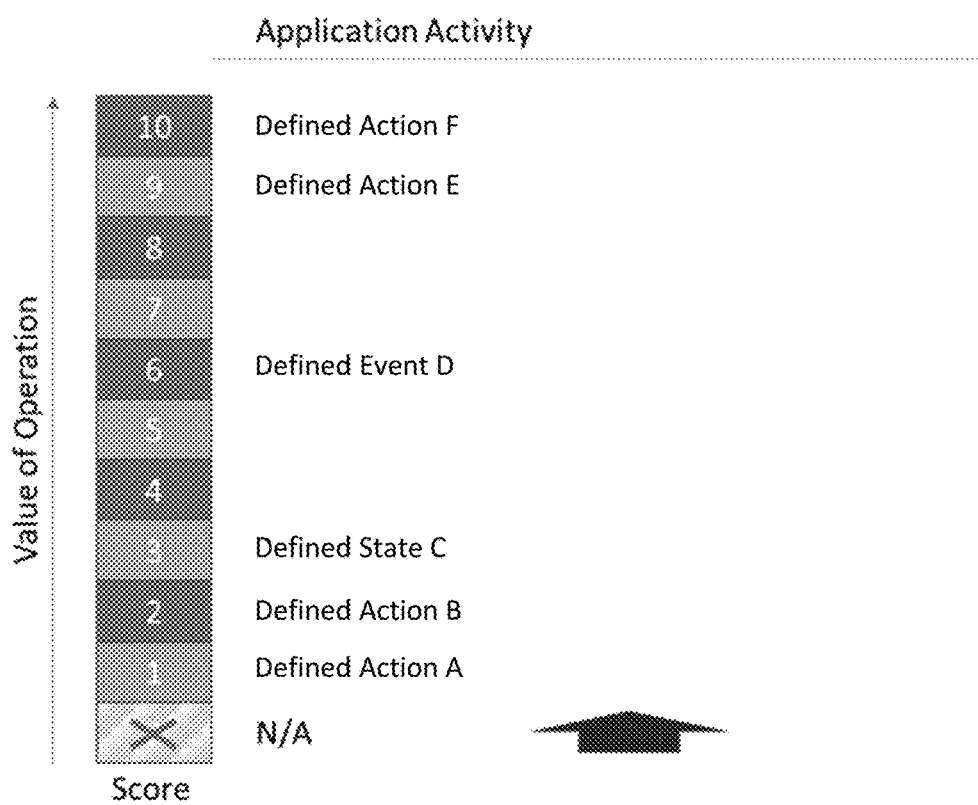

FIGS. 1A and 1B illustrate example document activity scoring systems. Referring to the example scoring systems in FIGS. 1A and 1B, a score of 0-10 is possible for the DAS. An application activity is assigned a value of operation. Any number of operations (defined actions, states, or events) including "insert" operations (e.g., paste, insert object) and "use" operations (e.g., where located in document, such as in comments, in a footnote, in a cell of a spreadsheet, etc.). This scoring system can be stored in any suitable structure and retrieved by the system to be used when applying a score to a particular document activity with respect to a URL or other object. The example in FIG. 1A, for general web, shows a value of 10 for Defined Action F, a value of 9 for Defined Action E, a value of 5 for Defined Event D, a value of 2 for Defined State C, a value of 1 for Defined Action B, and a value of 0 for Defined Action A. The value of the 0 indicates that the URL has not yet been added through a higher value activity.

High value seeding can impact low value scoring. After a site/page first gets added to the stack, it is considered "seeded". Certain signals which score zero for non-seeded sites/pages will now start scoring and accrue value to the object and user. As an illustrative example for the Defined Action A, which was given the value of 0, the action could be inserting a URL that is not previously known ("non-seeded"). In some cases, any activity with respect to a URL or other object may only be scored if the URL or other object has been previously seeded.

It should be understood that the "insertion" of a URL or other object may be carried out via any one of numerous commands that input content to a location or file and may even be broadly interpreted to include typing, speaking or inking a citation of a source for content in the document.

The example in FIG. 1B, for enterprise, is similar to that shown in FIG. 1A, but instead of having a non-seeded value of 0 for a first use of a URL (i.e., a non-seeded object), the non-seeded URLs also receive a score. The trusted nature of the enterprise environment can permit additional flexibility in scoring and control by tenant administrators so that the scoring system is adjustable for individual tenants. As shown in FIG. 1B, activities on seeded and non-seeded URLs are shifted up in value of operation. Here, a value of 6 is given for, a value of 3 is given for Defined State C; a value of 2 is given for Defined Action B; and a value of 1 is given for Defined Action A. It should, of course, be understood that the values in FIGS. 1A and 1B are for illustrative purposes and other application activity and values may be assigned. Both the value and the attribute (as a string or an identifier of the activity) for the DAS may be stored as metadata for the URL.

Figure 2:
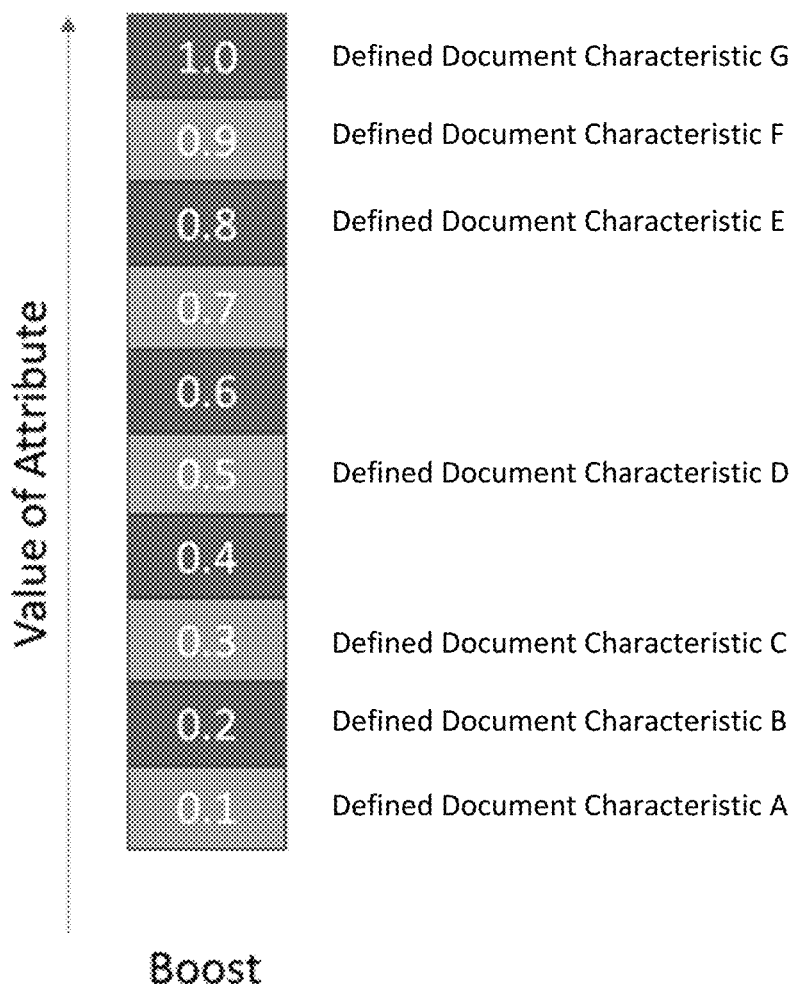
FIG. 2 illustrates an example document activity boost scoring system.

From the base line of the DAS, a boost can be added. A document attribute boost (DAB) can be assigned to the document (e.g., the file) in which the URL is used/acted upon. The context of a document activity determines the level of boost the DAS can get. The value of an attribute may be a reflection of the professionality of the context of the action. Boost values are additive so that where multiple attributes are present in the document, the associated values of those attributes can be added together to generate the DAB. As shown in FIG. 2, an example boost can be from attribute values of 0.1-1.0. In this illustrative example, various attributes, labeled as defined document characteristics, can be assigned particular values. Defined document characteristics can include, but are not limited to, size of document or file, number of pages, number of words, number of lines, number of slides, number of math symbols used, number of occupied cells, whether the document has an applied style or formatting, whether the document includes citations, whether the document includes footnotes, whether the document includes URLs, whether the document includes emails, whether the document include images, whether the document includes clip art, whether the document includes ink, whether the document includes a table, and whether the document includes media.

In FIG. 2, a value of 1.0 is given to a document that has defined document characteristic G; 0.9 is given to a document that has defined document characteristic F; 0.8 is given to a document that has defined document characteristic E; 0.5 is given to a document that has defined document characteristic D; 0.3 is given to a document that has defined document characteristic C; 0.2 is given to a document that has defined document characteristic B; and a value of 0.1 is given to a document that has defined document characteristic A. Thus, for a document having a defined document characteristic D, defined document characteristic C, and defined document characteristic E, the DAB would be 0.5+0.3+0.8=1.6. It should be understood that the term "document" as used herein refers to any file with a file format used by a productivity application and not just a word processing application. For example, spreadsheets, presentations, email, notebooks, and other files are included in the term "document". The individual values and their corresponding attributes (as a string or an identifier of the activity) for the DAB may be stored as metadata for the URL.

In some further implementations, a user history boost (UHB) can be included. As with the DAS and the DAB, the UHB can be stored as metadata with the URL. High value activities of a user can give a boost to the scores. In some cases, membership and/or profile information in professional networks, for example the LinkedIn network, can be used to identify users to apply UHB. The DAB boosted DAS can directly accrue to the UHB to increase the user value. That is, the attribute values from the document attributes and the document activities made by a user (individually or as part of a tenant) can be collected over time and used to generate a UHB value for the user (and possibly for an enterprise as a whole). The UHB may be used to minimize spam and users tricking the system.

The DAS, DAB, and UHB may each include negative values, resulting in a negative score. The negative scores can be used by the system to minimize spam from entering and/or remaining in the corpus. In addition, for enterprise scenarios, tenant administrators may customize the system for score and boosts.

FIG. 3A illustrates a process flow for new content and FIG. 3B illustrates a process flow for seeded content. Referring to FIG. 3A, an activity with respect to a URL can be detected, where the URL is new content (not yet been seeded in to the corpus). In this case, the URL undergoes a verification before a score is applied to the URL and boosted. Verification may include checking to make sure that the URL points at a publicly accessible web resource. The verification process can be similar to the methodologies used in search systems. For example, the verification process can include, but is not limited to, identifying whether the object contains excluded words and topics (i.e., pornographic content, violence) according to editorial guidelines, performing skin and blood detection on images to make sure that unintended graphic content is excluded, and checking against an exclude sites lists. The steps in the process flow for new content can include detection of activity (302), verification (304), generating a DAS score (306), applying a DAB to the score (308), and, optionally, applying a UHB to the score (310). The URL can then be split, with the domain and score added to the domain stack (312) (which then contains just the domain) and the page and score added to the page stack (314) (which then contains the full URL). Referring to FIG. 3B, seeded content does not require verification, as the URL is already in the stack. Thus, when activity involving adding a URL to a document is detected (302), the process moves to generating a DAS score (306), applying the DAB to the score (308), optionally applying the UHB to the score (310), adding the boosted score to the domain in the domain stack (316), and adding the boosted score to the page in the page stack (318).

Figure 4A:
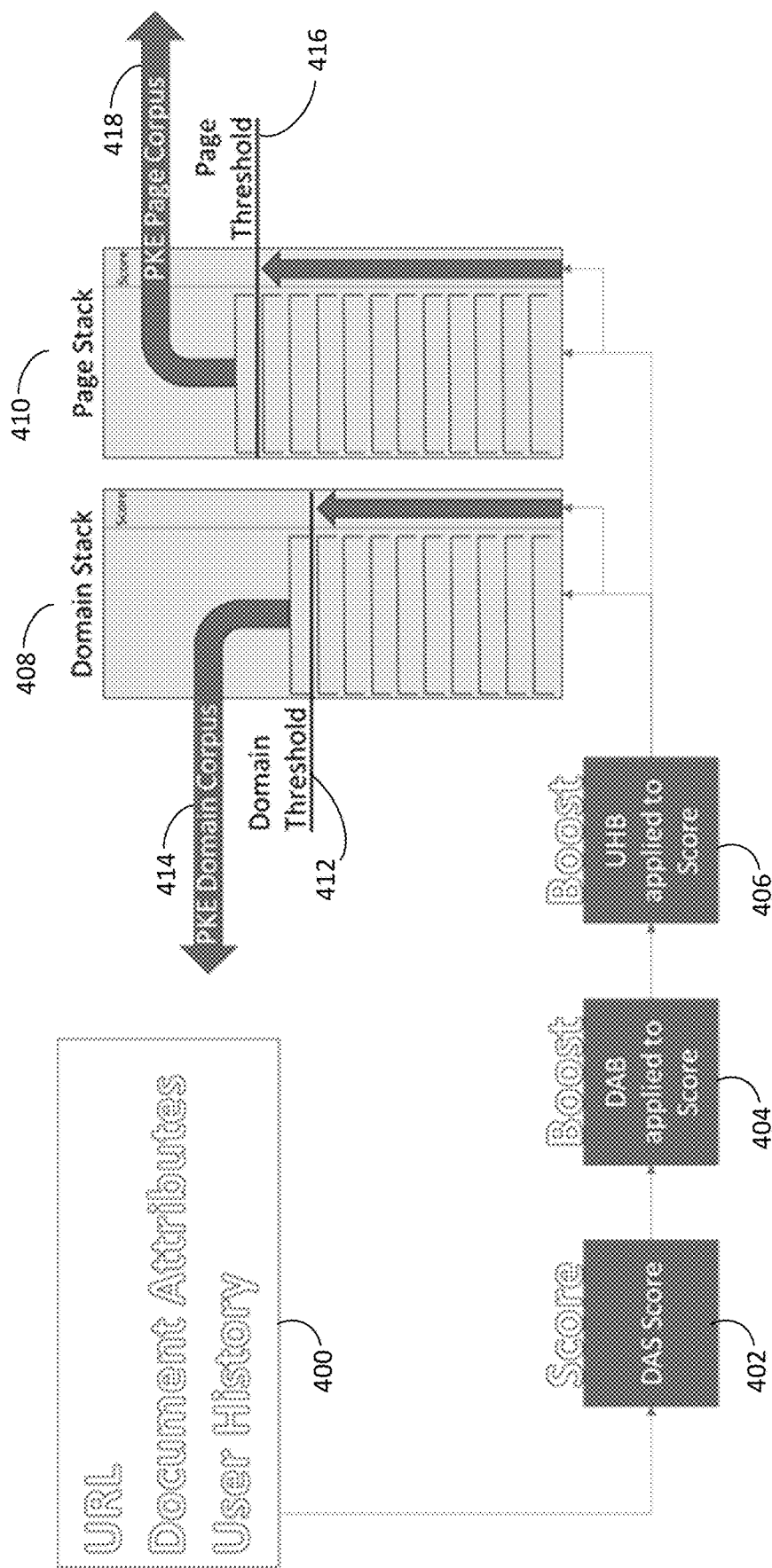
FIGS. 4A-4C illustrate conceptual schematics of the process flow into content stacks.
Figure 4B:
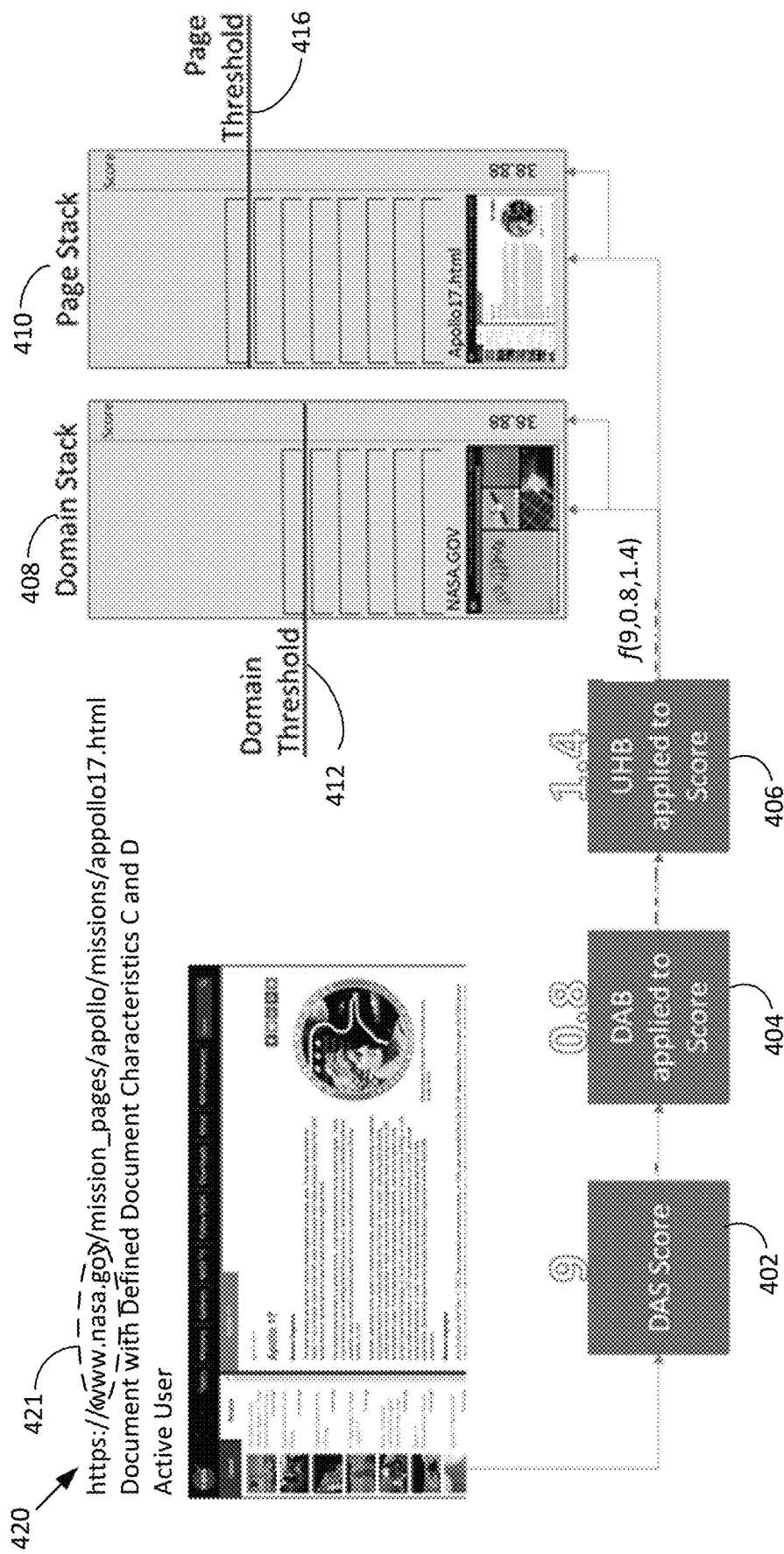
Figure 4C:
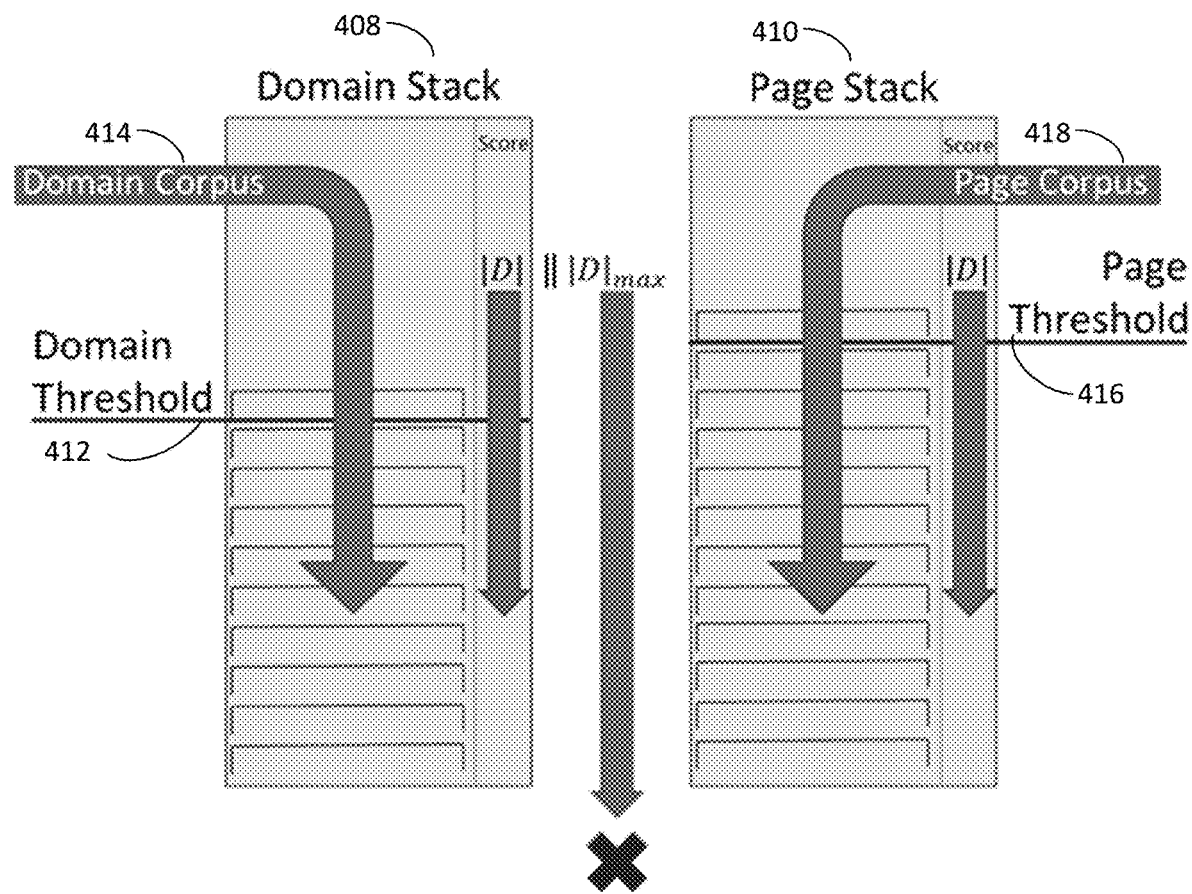
Figure 5:
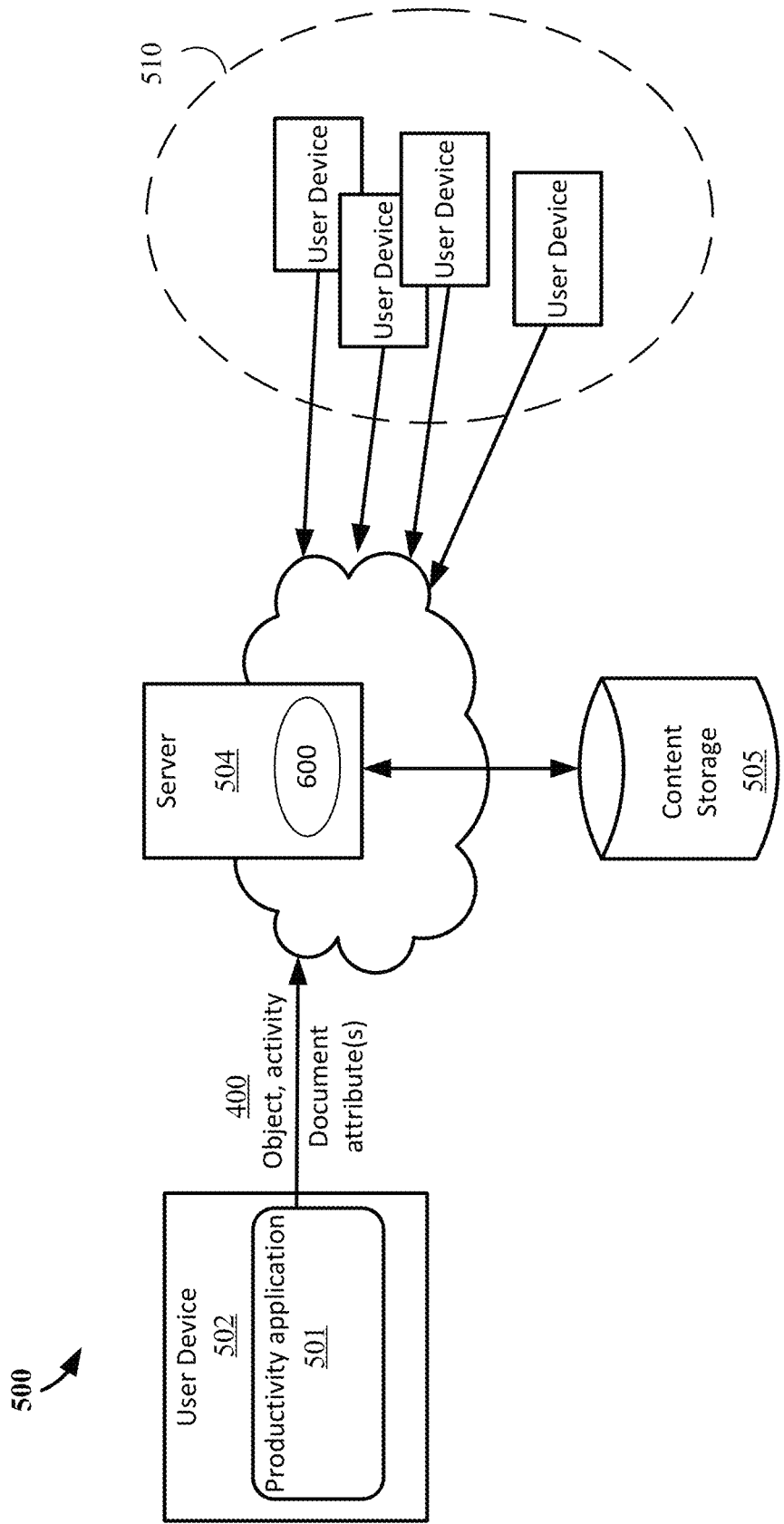
FIG. 5 illustrates an example operating environment.

FIGS. 4A-4C illustrate conceptual schematics of the process flow into content stacks; and FIG. 5 illustrates an example operating environment. Referring to FIGS. 4A and 5, in operating environment 500, a URL may come in as an activity (e.g., insert, paste) and used in a document being authored within a productivity application 501 at a user device 502. The URL (or other object), activity, document attributes and user history (collectively 400) can be provided to a server 504 performing method 600. The particular information provided to server 504 may vary depending on environment. For example, in an enterprise/business environment, particularly where all users are part of a specific organization (or are given guest or vendor access to that system), additional details about the user, hierarchy within the organization, and even information about the content itself may be provided to the server 504 (since the trusted sources would be managed and maintained for the enterprise in what may be a private corpus and not a public corpus). In contrast, for home/public productivity application scenarios, additional layers of privacy are expected and any data collected would require user permission and, even with user permission, information that is provided to the server may maintain anonymization. In both enterprise and home/public scenarios, it should be understood that any information sent to, and received by, the server 504 would be carried out with respect to the privacy and security policies in place.

At the server 504, after receiving 400, a DAS Score is generated (402) for the URL (or other object) and then boosted, for example by applying the DAB (404) and applying the UHB (406) to the DAS Score. The applying of the DAB (404) and applying of the UHB (406) can result in a DAB and UHB boosted score equal to f(DAS,DAB,UHB), where the score is a function of the DAS, DAB, and UHB.

The URL and its boosted score are stored and the score monitored to determine if/when the score reaches a threshold to move the URL to the corpus. As described with respect to FIGS. 3A and 3B, the domain and page of the URL can be separately monitored for adding to a corpus. For example, the domain (and its score) can be added to a domain stack 408 and the page (and its score) can be added to the page stack (410). As a previously existing domain and page has activity (for example through actions within the same or other productivity application by the user at device 502 or the same or different users at other devices 510), the new boosted scores can be added to the existing score. When the domain score reaches a domain threshold 412, that domain can be moved to the domain corpus 414. In addition, when a page score reaches a page threshold 416, that page can be moved to the page corpus 418. The domains, pages, and respective scores can be stored in a storage resource 505, which may be made up of one or more storage devices. The storage resource can be "flat storage" that stores values of the domain, page, score, and any metadata including the data used to apply and/or boost the score.

FIG. 4B illustrates a scenario for an active user working within a document with Defined Document Characteristic E and performs Defined Action E with respect to a URL of https://www.nasa.gov/mission_pages/apollo/missions/apollo17.html 420. This information (subject to appropriate privacy and security policies) can be provided to the server 504, which generates a DAS score (402) of 9 if using the scoring system shown in FIG. 1A. The score is then boosted by applying a DAB to the score (404). Since the document has the Defined Document Characteristics C and D, the DAB is 0.8 when using the document attribute boost system of FIG. 2. The DAB boosted score can be further boosted by applying the UHB (406), in this example, a value of 1.4. After calculating the score (e.g., generating score and applying the one or more boosts), the domain, nasa.gov 421, is sent to the domain stack 408, while the whole URL is sent to the page stack 410.

Referring to FIG. 4C, it is possible to have objects removed from a corpus, particularly as their scores decrease through, for example, negative scores added to the existing scores. The negative scores can cause the objects to drop below the thresholds, even to negative values. User reporting of undesired content may be used to remove content from corpus. The type of inappropriateness determines the |D| of both domain and page back into the stack or complete removal (referred to as $|D|_{max}$). Domain removal can cause page removal. The UHB score can have a great impact on |D|. In addition, inactive domains and sites can age out over time.

Figure 6:
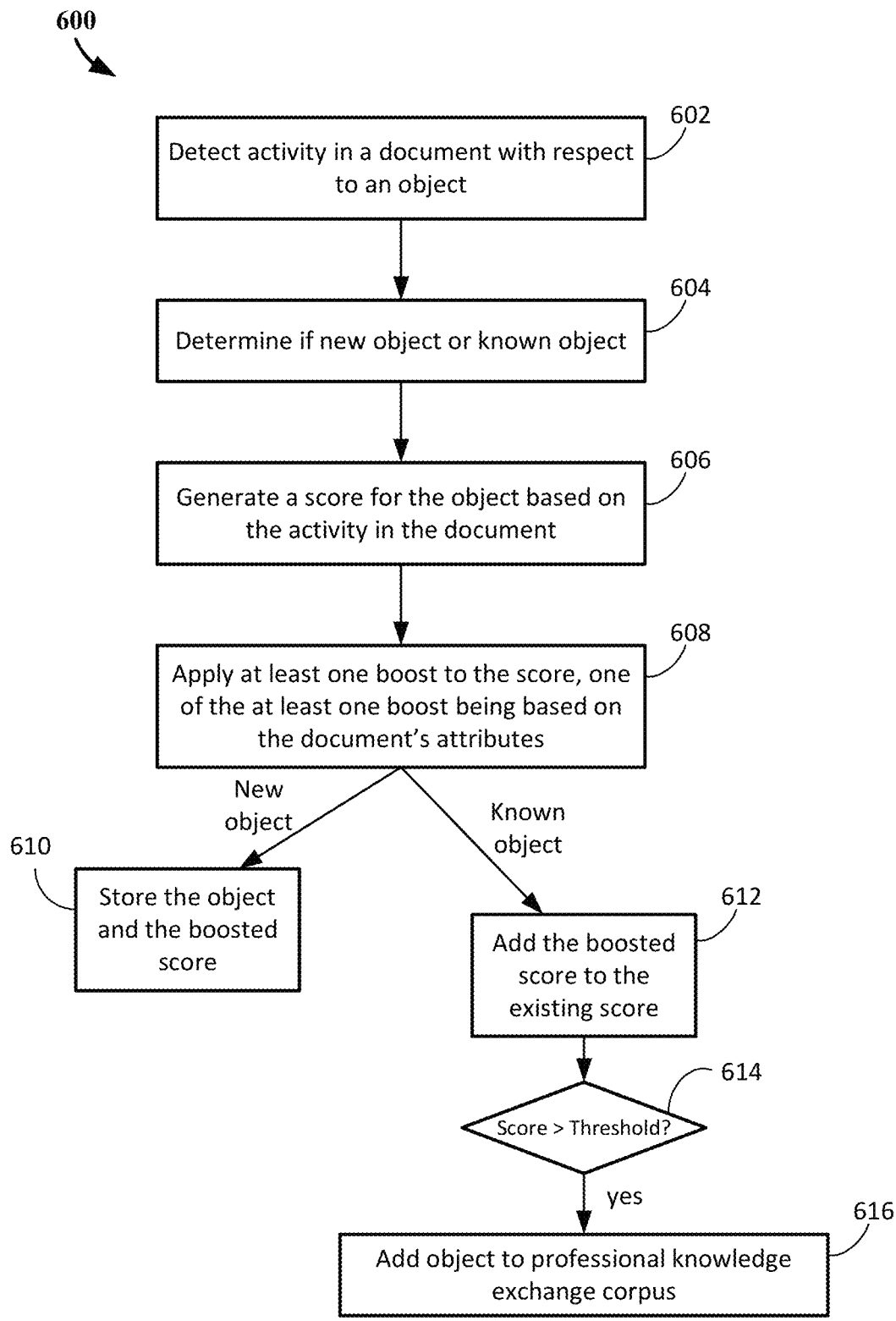
FIG. 6 illustrates a method performed by a system for identifying and managing trusted sources in online and networked content for professional knowledge exchange.

FIG. 6 illustrates a method performed by a system for identifying and managing trusted sources in online and networked content for professional knowledge exchange. Method 600 can include detecting activity in a document with respect to an object (602) and determining if the object is a new object or a known object (604). The detecting of activity in the document may be a result of receiving information from productivity software of a user action, the object, and document attributes. User history information may be included with the information or retrieved separately. Certain information about the document (e.g., document attributes) may be provided (with user permission) from the productivity application 501 and/or other software application to the server 504 including, but not limited to, topic, length, and structure (e.g., report, essay, presentation, argument, chronological, bulleted list, table of content, footnotes, etc.).

Regarding operation 604, a "known" object is an object that has already been seeded (e.g., exists) in the storage. The determining of whether the object is new or known can be performed by querying or otherwise searching the storage (e.g., storage 505) to determine if the object is in the storage; if so, the object is known. Operation 604 may be performed before, during, or after operations 606 and/or 608.

The method can continue with generating a score for the object based on the activity in the document (606). At least one boost can be applied to the score (608). One of the at least one boost is based on the document's attributes. Another boost can be the user history. Of course other weights, multipliers, and additions can be used. A table or other structure indicating attributes and values may be stored by a server performing method 600 and retrieved by the server to perform the boost(s).

If the object is the new object, the object and the boosted score is stored (610). If the object is the known object, the boosted score is added to the existing score in the storage (612). The score is checked to see if the score is greater than (or equal to or greater than) a threshold (614), when it is equal to or greater than (or just greater than) the threshold, then the object is added to the professional knowledge exchange corpus (616). Even when added to the corpus, it is possible to continue to have the score of the object updated. In this manner, it is also possible for an object to fall from the corpus due to sufficient negative scores (that cause the score to fall below the threshold).

Figure 7A:
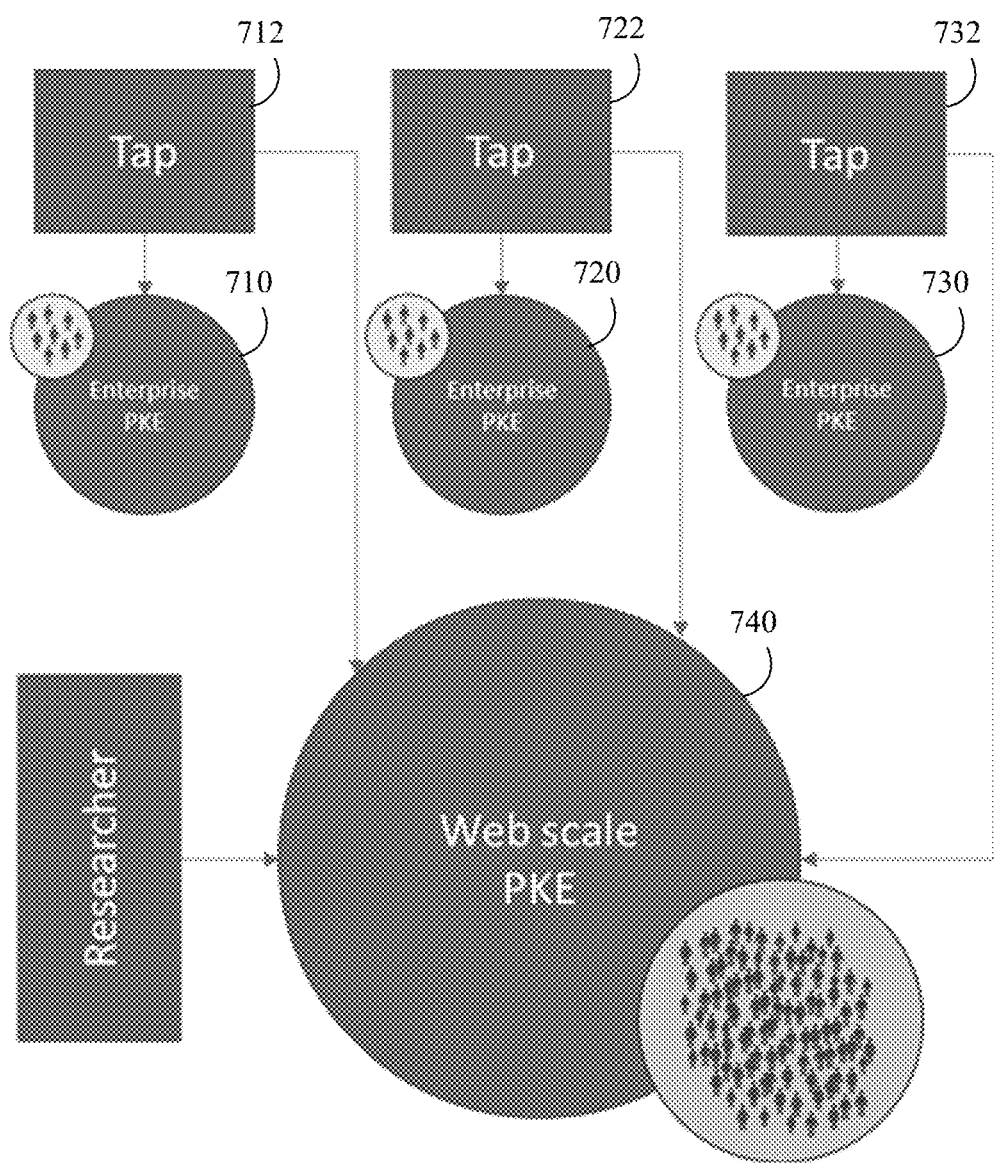
FIG. 7A illustrates search and discover corpora for enterprise and web-scale identification and managing of trusted sources.

FIG. 7A illustrates search and discover corpora for enterprise and web-scale identification and managing of trusted sources. Information workers can build a tenant specific professional knowledge exchange corpus by contributing to the trusted knowledge of their organization (e.g., corpus 710, 720, 730). The daily professional use of the office productivity applications within the tenant can provide the signal for the system to generate the corpora. The scoring system in the tenant may be adjusted to the trusted nature of the community. Enterprise users can choose to contribute anonymously or using their organization identifier to tenant specific corpora and, based on policy, may contribute to the web-scale corpus. Students and consumers of office productivity software services can choose to contribute to the web-scale corpus 740 anonymously or using their user identifier profile (for the software services).

Figure 7B:
FIGS. 7B and 7C illustrate user interfaces for the consumer and enterprise, respectively.
Figure 7C:
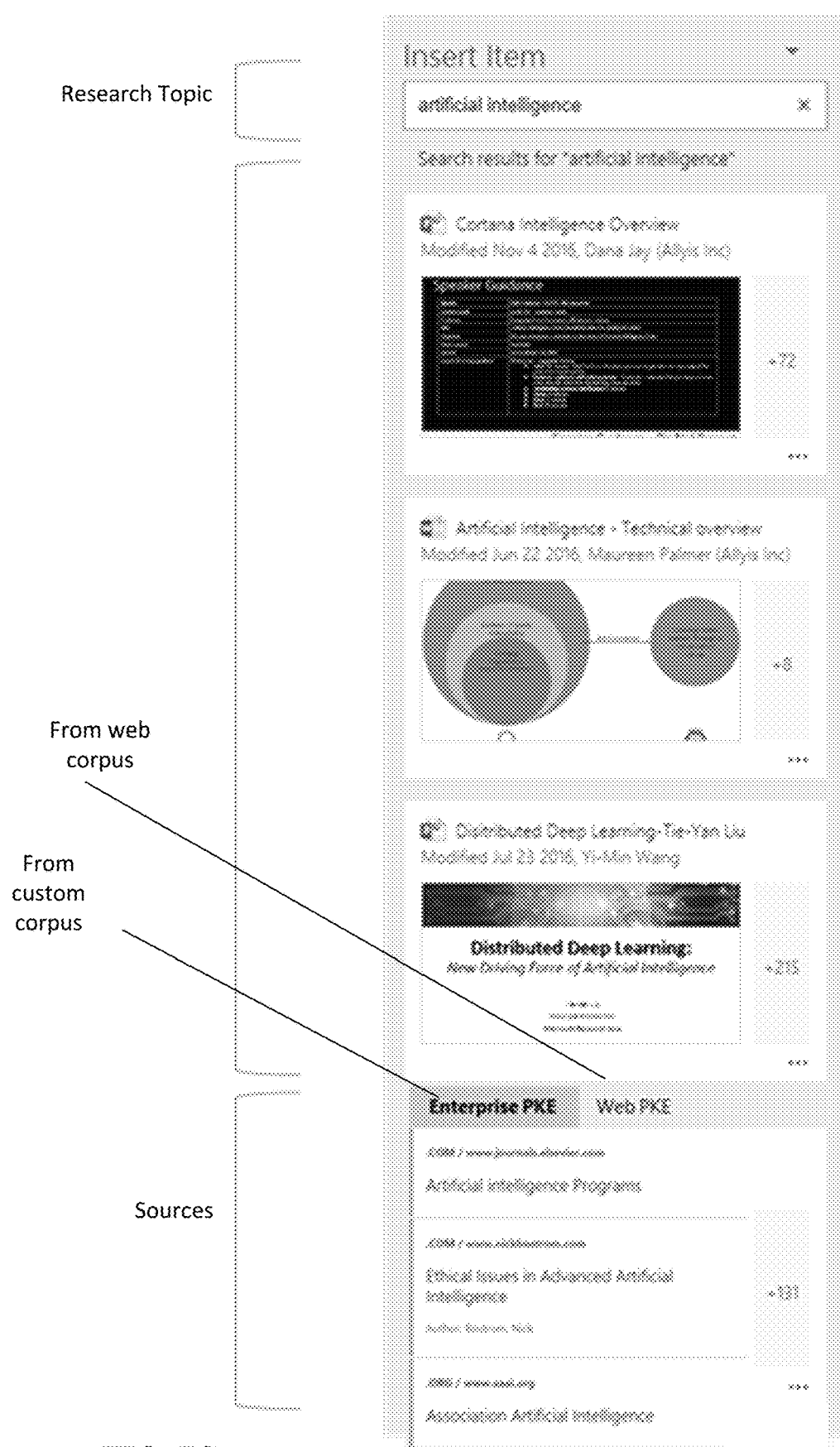

The tenant-specific corpus alone or in combination with the web-scale corpus (e.g., corpus 740) can be accessed by the office productivity applications (e.g., via Taps 712, 722, 732) when citations and/or content is searched. Information from the web-scale corpus (e.g., corpus 740) can be accessed, for example, by the office productivity applications and/or research applications such as Microsoft Researcher. FIGS. 7B and 7C illustrate user interfaces for the consumer and enterprise, respectively. In the consumer researcher feature, the professional knowledge exchange of the web-scale corpus can greatly enhance coverage of trusted resources. Referring to FIG. 7B, a research topic of "challenger explosion" can result in a set of identified research topics and may further include sources from the web scale corpus 740 relevant to the research topic. The increased coverage through the corpus 740 can be used to increase precision and recall for the consumer researcher feature. Referring to FIG. 7C, in the enterprise environment, the Tap results (e.g., available from Taps 712, 722, 732) can remain based on personalized search optimized for re-finding enterprise content, and further include results from the custom corpus (e.g., corpus 710, 720, 730) as well as the web scale corpus 740 (see tables in the user interface).

The trusted and vetted URLs in the corpora can be provided to other services, which can scrape the sources identified by the URLs (also referred to as "washing").

As previously mentioned, although URLs are specifically described herein, other objects may be identified as "trusted", stored in a corpus, and accessed during research of a topic. The inclusion of the object to the corpus would also be based on the document activity and the document attributes. Interestingly, it is the document information (for the document in which the object is inserted or otherwise used) and/or the user performing the insertion/activity, and not the content at the URL or the content of the non-URL object that is used to score the trustworthiness of the object (and thus used to vet the document). In some cases, the underlying content and/or the content of the document itself may be used to refine the vetting/trustworthiness.

Figure 8:
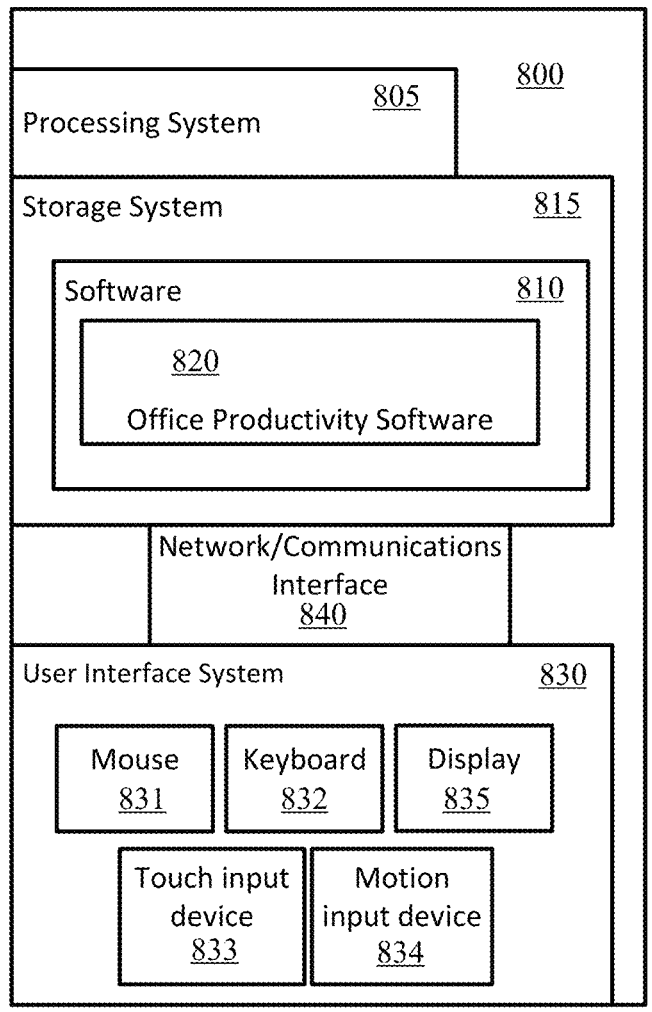
FIG. 8 illustrates components of a computing device that may be used in certain implementations described herein.
Figure 9:
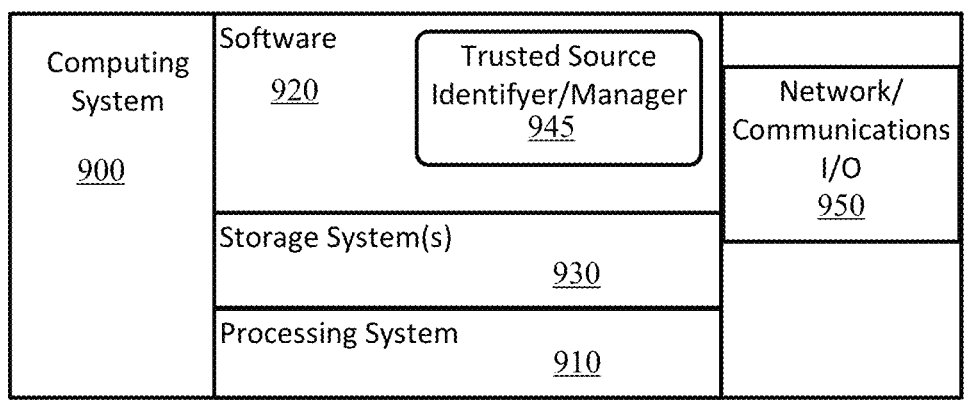
FIG. 9 illustrates components of a computing system that may be used to implement certain methods and services described herein.

FIG. 8 illustrates components of a computing device that may be used in certain implementations described herein; and FIG. 9 illustrates components of a computing system that may be used to implement certain methods and services described herein.

Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as Office productivity software 820. Device operating systems generally control and coordinate the functions of the various components in the computing device, providing an easier way for applications to connect with lower level interfaces like the networking interface.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the office productivity software 820.

Storage system 815 may include volatile and nonvolatile memory, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory signal.

Storage system 815 may be implemented as a single storage device but may also be implemented across multiple storage devices or sub-systems co-located or distributed relative to each other. Storage system 815 may include additional elements, such as a controller, capable of communicating with processing system 805.

Software 810 may be implemented in program instructions and among other functions may, when executed by system 800 in general or processing system 805 in particular, direct system 800 or the one or more processors of processing system 805 to operate as described herein.

The system can further include user interface system 830, which may include input/output (I/O) devices and components that enable communication between a user and the system 800. User interface system 830 can include input devices such as a mouse 831, track pad (not shown), keyboard 832, a touch device 833 for receiving a touch gesture from a user, a motion input device 834 for detecting non-touch gestures and other motions by a user, a microphone for detecting speech (not shown), and other types of input devices and their associated processing elements capable of receiving user input.

The user interface system 830 may also include output devices such as display screen(s) 835, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 835 in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein may be performed on a system such as shown in FIG. 9. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 920 from storage system 930. Processing system 910 may be implemented within a single processing device but may also be distributed across multiple processing devices or sub-systems that cooperate in executing program instructions.

Storage system(s) 930 can include any computer readable storage media readable by processing system 910 and capable of storing software 920. Storage system 930 may be implemented as a single storage device but may also be implemented across multiple storage devices or sub-systems co-located or distributed relative to each other. Storage system 930 may include additional elements, such as a controller, capable of communicating with processing system 910. Storage system 930 may also include storage devices and/or sub-systems on which data such as entity-related information is stored.

Software 920, including service 945, may be implemented in program instructions and among other functions may, when executed by system 900 in general or processing system 910 in particular, direct the system 900 or processing system 910 to operate as described herein for the identification and management of vetted and trusted sources (and its various components and functionality), including process 600.

System 900 may represent any computing system on which software 920 may be staged and from where software 920 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. It should be understood that as used herein, in no case do the terms "storage media", "computer-readable storage media" or "computer-readable storage medium" consist of transitory, propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   detecting an activity in a document of a productivity application with respect to use of a URL by a user, the detecting of the activity comprising receiving the URL, information about the use of the URL, and attributes of the document;
   generating a document activity score for the document based on the information about the use of the URL by the user;
   determining a document attribute boost value based on the attributes of the document;
   combining the document attribute boost value to the document activity score for a boosted score;
   searching a storage for any instances of the URL, wherein a domain of the URL and a page of the URL are separately monitored to add to a corpus of trusted sources;
   in response to there being no instances of the domain of the URL in the storage, storing the domain of the URL and at least the boosted score in the storage, wherein the page of the URL and at least the boosted score are separately stored in the storage;
   in response to there being no instances of the page of the URL and an existing instance of the domain of the URL in the storage, storing the page of the URL and at least the boosted score in the storage, and adding the boosted score to the existing instance of the domain of the URL already in the storage;
   in response to there being an existing instance of the domain of the URL and the page of the URL in the storage, adding the boosted score to the existing instance of the domain of the URL and the page of the URL already in the storage;
   determining that the boosted score has accrued to a value that reaches or exceeds a threshold value; and
   in response to determining that the boosted score has accrued to the value that reaches or exceeds the threshold value, assigning the URL to the corpus of trusted sources,
   after detecting further activity in the document, in response to one or both of the document activity score and the document attribute boost value being negative, decrementing the boosted score, wherein the URL is removed from the corpus of trusted sources when the boosted score falls to below the threshold value.

2. The method of claim 1, wherein generating the document activity score for the document based on the information about the use of the URL by the user comprises:
   retrieving a scoring system for the document activity score; and
   determining a value associated with the information about the use of the URL.

3. The method of claim 2, wherein the value for the boosted score and an attribute corresponding to the information about the use of the URL are stored as metadata for the URL in the storage.

4. The method of claim 1, wherein determining the document attribute boost value based on the attributes of the document comprises:
   retrieving a scoring system for the document attribute boost value;
   identifying attributes from the attributes of the document that have an associated value in the scoring system; and
   generating a score based on the values associated with the identified attributes.

5. The method of claim 4, wherein the identified attributes and each associated value are stored as metadata for the URL in the storage.

6. The method of claim 1, further comprising:
   determining a user history boost using information about prior use of objects by the user and applying the user history boost to the boosted score.

7. The method of claim 6, wherein the user history boost is applied based on membership or profile information of the user in a professional network.

8. The method of claim 1, wherein the corpus is an enterprise corpus.

9. The method of claim 1, wherein the corpus is a web-scale corpus.

10. A system comprising:
    a processing system;
    one or more storage media including a storage resource; and
    instructions for identifying and managing trusted sources in online and networked content stored on at least one of the one or more storage media, the instructions directing the processing system to at least:

receive information of an activity in a document of a productivity application with respect to use of a URL by a user, the information comprising the URL, information about the use of the URL, and attributes of the document;

generate a document activity score for the document based on the information about the use of the URL by the user;

determine a document attribute boost value based on the attributes of the document;

combine the document attribute boost value to the document activity score for a boosted score;

search the storage resource for any instances of the URL, wherein a domain of the URL and a page of the URL are separately monitored to add to a corpus of trusted sources;

in response to there being no instances of the domain of the URL in the storage resource, store the domain of the URL and at least the boosted score in the storage resource, wherein the page of the URL and at least the boosted score are separately stored in the storage resource;

in response to there being no instances of the page of the URL and an existing instance of the domain of the URL in the storage resource, store the page of the URL and at least the boosted score in the storage resource, and add the boosted score to the existing instance of the domain of the URL already in the storage resource;

in response to there being an existing instance of the domain of the URL and the page of the URL in the storage resource, add the boosted score to the existing instance of the domain of the URL and the page of the URL already in the storage resource;

determine that the boosted score has accrued to a value that reaches or exceeds a threshold value; and in response to determining that the boosted score has accrued to the value that reaches or exceeds the threshold value, assign the URL to the corpus of trusted sources, in response to one or both of the document activity score and the document attribute boost value being negative, decrement the boosted score; and remove the URL from the corpus of trusted sources when the boosted score falls to below the threshold value.

11. The system of claim 10, wherein the instructions that direct the processing system to generate the document activity score for the document based on the information about the use of the URL by the user, direct the processing system to:

retrieve a scoring system for the document activity score from one of the one or more storage media; and determine a value associated with the information about the use of the URL.

12. The system of claim 10, wherein the instructions that direct the processing system to determine the document attribute boost value based on the attributes of the document, direct the processing system to:

retrieve a scoring system for the document attribute boost value from the one or more storage media;

identify attributes from the attributes of the document that have an associated value in the scoring system; and generate a score based on the values associated with the identified attributes.

13. The system of claim 10, wherein the instructions further direct the processing system to:

determine a user history boost using information about prior uses of objects by the user and apply the user history boost to the boosted score.

14. One or more computer-readable storage media having instructions stored thereon that, when executed by a processing system, direct the processing system to:

receive information of an activity in a document of a productivity application with respect to use of a URL by a user, the information comprising the URL, information about the use of the URL, and attributes of the document;

generate a document activity score for the document based on the information about the use of the URL by the user;

determine a document attribute boost value based on the attributes of the document;

combine the document attribute boost value to the document activity score for a boosted score;

determine a user history boost using information about prior uses of objects by the user and apply the user history boost to the boosted score;

search a storage resource for any instances of the URL, wherein a domain of the URL and a page of the URL are separately monitored to add to a corpus of trusted sources;

in response to there being no instances of the domain of the URL in the storage resource, store the domain of the URL and at least the boosted score in the storage resource, wherein the page of the URL and at least the boosted score are separately stored in the storage resource;

in response to there being no instances of the page of the URL and an existing instance of the domain of the URL in the storage resource, store the page of the URL and at least the boosted score in the storage resource, and add the boosted score to the existing instance of the domain of the URL already in the storage resource;

in response to there being an existing instance of the domain of the URL and the page of the URL in the storage resource, add the boosted score to the existing instance of the domain of the URL and the page of the URL already in the storage resource;

determine that the boosted score has accrued to a value that reaches or exceeds a threshold value;

in response to determining that the boosted score has accrued to the value that reaches or exceeds a threshold value, assign the URL to the corpus of trusted sources;

in response to one or both of the document activity score and the document attribute boost value being negative, decrement the boosted score;

determine that the boosted score has abated to a value that is less than the threshold value; and in response to determining that the boosted score has abated to the value that is less than the threshold value, remove the URL from the corpus of trusted sources.

\* \* \* \* \*